United States Patent
Gou et al.

(10) Patent No.: US 12,231,244 B2
(45) Date of Patent: Feb. 18, 2025

(54) TECHNIQUES FOR CONSTRUCTING A HYBRID AUTOMATIC REPEAT REQUEST ACKNOWLEDGEMENT CODEBOOK

(71) Applicant: ZTE Corporation, Guangdong (CN)

(72) Inventors: Wei Gou, Guangdong (CN); Junfeng Zhang, Guangdong (CN); Peng Hao, Guangdong (CN); Shuaihua Kou, Guangdong (CN)

(73) Assignee: ZTE Corporation, Guangdong (CN)

( * ) Notice: Subject to any disclaimer, the term of this patent is extended or adjusted under 35 U.S.C. 154(b) by 13 days.

(21) Appl. No.: 18/456,318

(22) Filed: Aug. 25, 2023

(65) Prior Publication Data

US 2023/0412311 A1    Dec. 21, 2023

Related U.S. Application Data

(63) Continuation of application No. PCT/CN2021/138157, filed on Dec. 15, 2021.

(51) Int. Cl.
*H04L 1/1812* (2023.01)
*H04L 1/00* (2006.01)
(Continued)

(52) U.S. Cl.
CPC .......... *H04L 1/1812* (2013.01); *H04L 1/0064* (2013.01); *H04L 1/1861* (2013.01);
(Continued)

(58) Field of Classification Search
CPC ... H04L 1/1812; H04L 1/0064; H04L 1/1861; H04L 5/001; H04L 5/0055; H04L 5/1469
(Continued)

(56) References Cited

U.S. PATENT DOCUMENTS 6,367,078 B1 * 4/2002 Lasky ............... H04N 21/4312
725/38
8,885,526 B2 * 11/2014 He ........................ H04L 1/1896
370/280
(Continued)

FOREIGN PATENT DOCUMENTS

CN      103312474      9/2013
CN      113572585      10/2021
(Continued)

OTHER PUBLICATIONS

Extended European Search Report for 21967587.3, Report dated Sep. 12, 2024, 7 pages.
(Continued)

*Primary Examiner* — John J Tabone, Jr.
(74) *Attorney, Agent, or Firm* — Perkins Coie LLP

(57) ABSTRACT

Techniques are described to construct a semi-static hybrid automatic repeat request acknowledgement (HARQ-ACK) codebook. An example wireless communication method includes determining, by a communication device that is configured to communicate with a first cell and a second cell, a position of a first time slot associated with the first cell that overlaps with a second time slot associated with the second cell, where the second time slot is configured for a transmission of a hybrid automatic repeat request (HARQ) acknowledgement (ACK) information; determining, for the HARQ-ACK information, a plurality of time slots associated with the first cell and the second cell based on the position of the first time slot and a set of values associated with the first cell; and transmitting, by the communication device, the HARQ-ACK information for the plurality of time slots in the second time slot to the second cell.

21 Claims, 9 Drawing Sheets

(51) Int. Cl.
*H04L 1/1829* (2023.01)
*H04L 5/00* (2006.01)
*H04L 5/14* (2006.01)

(52) U.S. Cl.
CPC ............ *H04L 5/001* (2013.01); *H04L 5/0055* (2013.01); *H04L 5/1469* (2013.01)

(58) Field of Classification Search
USPC ............ 714/748, 749, 821; 370/280; 398/98
See application file for complete search history.

(56) References Cited

U.S. PATENT DOCUMENTS 9,872,215 B2 * 1/2018 Igarashi ............... H04W 36/026
2019/0306841 A1 * 10/2019 Huang .................. H04L 5/0055
2022/0116150 A1 * 4/2022 Kim ...................... H04L 1/1822
2023/0412311 A1 * 12/2023 Gou ...................... H04L 5/1469
2024/0236986 A1 * 7/2024 Bae ....................... H04L 1/1861

FOREIGN PATENT DOCUMENTS

WO  2020/096438  5/2020
WO  2021/160047  8/2021

OTHER PUBLICATIONS

International Search Report and Written Opinion for PCT/CN2021/138157, filed Dec. 15, 2021, Report dated Jul. 27, 2022, 7 pages.

* cited by examiner

TECHNIQUES FOR CONSTRUCTING A HYBRID AUTOMATIC REPEAT REQUEST ACKNOWLEDGEMENT CODEBOOK

CROSS-REFERENCE TO RELATED APPLICATION

This application is a continuation and claims priority to International Application No. PCT/CN2021/138157, filed on Dec. 15, 2021, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed at least for constructing a semi-static hybrid automatic repeat request acknowledgement (HARQ-ACK) codebook (e.g., type 1 HARQ-ACK codebook) when semi-static physical uplink control channel (PUCCH) carrier switching is configured.

An example wireless communication method includes determining, by a communication device that is configured to communicate with a first cell and a second cell, a position of a first time slot associated with the first cell that overlaps with a second time slot associated with the second cell, where the second time slot is configured for a transmission of a hybrid automatic repeat request (HARQ) acknowledgement (ACK) information; determining, for the HARQ-ACK information, a plurality of time slots associated with the first cell and the second cell based on the position of the first time slot and a set of values associated with the first cell; and transmitting, by the communication device, the HARQ-ACK information for the plurality of time slots in the second time slot to the second cell.

In some embodiments, the plurality of time slots includes a first set of time slots associated with the first cell and a second set of time slots associated with the second cell, and each time slot from the first set of time slots of the first cell overlaps with one time slot from the second set of time slots of the second cell. In some embodiments, a slot length of the first cell is the same as that of the second cell. In some embodiments, the plurality of time slots includes a first set of time slots associated with the first cell and a second set of time slots associated with the second cell, and each time slot from the first set of time slots of the first cell overlaps with two or more time slots from the second set of time slots of the second cell. In some embodiments, a slot length of the first cell is greater than that of the second cell.

In some embodiments, the HARQ-ACK information includes a first HARQ-ACK information concatenated with a second HARQ-ACK information, the first HARQ-ACK information indicates whether data or signals are received on the first set of time slots from the first cell, and the second HARQ-ACK information indicates whether data or signals are received on the second set of time slots from the second cell. In some embodiments, the first HARQ-ACK information is concatenated with the second HARQ-ACK information in the HARQ-ACK information based on an ascending order of carrier indexes of the first cell and the second cell.

Another example wireless communication method includes determining, by a communication device that is configured to communicate with a first cell and a second cell, at least two positions of at least two time slots associated with the first cell that overlap with a time slot associated with the second cell, where the time slot is configured for a transmission of a hybrid automatic repeat request (HARQ) acknowledgement (ACK) information; determining, for the HARQ-ACK information, a plurality of time slots associated with the first cell and the second cell based on at least one position of the at least two positions of the at least two time slots and a set of values associated with the first cell; and transmitting, by the communication device, the HARQ-ACK information for the plurality of time slots in the time slot to the second cell.

In some embodiments, the determining the plurality of time slots is performed based on the at least two positions of the at least two time slots, the plurality of time slots includes a first set of time slots associated with the first cell and a second set of time slots associated with the second cell, and each time slot from the second set of time slots of the second cell overlaps with two or more time slot from the first set of time slots of the first cell. In some embodiments, the determining the plurality of time slots is performed based on one position of one time slot from the at least two time slots, the plurality of time slots includes a first set of time slots associated with the first cell and a second set of time slots associated with the second cell, and each time slot from the second set of time slots of the second cell overlaps with two or more time slot from the first set of time slots of the first cell. In some embodiments, a slot length of the first cell is less than that of the second cell.

In some embodiments, the HARQ-ACK information includes a first HARQ-ACK information concatenated with a second HARQ-ACK information, the first HARQ-ACK information indicates whether data or signal are received on the first set of time slots from the first cell, and the second HARQ-ACK information indicates whether data or signal are received on the second set of time slots from the second cell. In some embodiments, the first HARQ-ACK information is concatenated with the second HARQ-ACK information in the HARQ-ACK information based on an ascending order of carrier indexes of the first cell and the second cell.

In some embodiments, the at least two time slots or the one time slot are determined based on: the at least two time slots or the one time slot overlapping with the time slot associated with the second cell, and the at least two time slots or the one time slot being associated with one or more time slots that receives data or signal from the first cell or the second cell based on the set of values associated with the first cell. In some embodiments, in response to the determining the plurality of time slots associated with the first cell and the second cell, the method further comprises: determining that two time slots from the plurality of time slots are repeated; and removing one of the two time slots from the plurality of time slots. In some embodiments, the first cell includes a primary cell, and wherein the second cell includes a secondary cell.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Techniques are disclosed at least for constructing a semi-static hybrid automatic repeat request acknowledgement (HARQ-ACK) codebook (e.g., type 1 HARQ-ACK codebook) when semi-static physical uplink control channel (PUCCH) carrier switching is configured.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

A user equipment (UE) can be configured with two carriers to allow semi-static PUCCH carrier switching, which are respectively denoted as carrier 0 (for example, Pcell) and carrier 1 (for example, Scell). In this way, carrier 0 (Pcell) will be configured with PUCCH-config, and carrier 1 (Scell) will also be configured with PUCCH-config. In the existing agreement, in this case, the k1 included in the DCI for scheduling the PDSCH is interpreted based on the slot length of the Pcell (reference carrier) and the PUCCH-config of the Pcell. The description of k1 is included in TS38.213, and k1 in this patent document may be referred to as "k".

Figure 1:
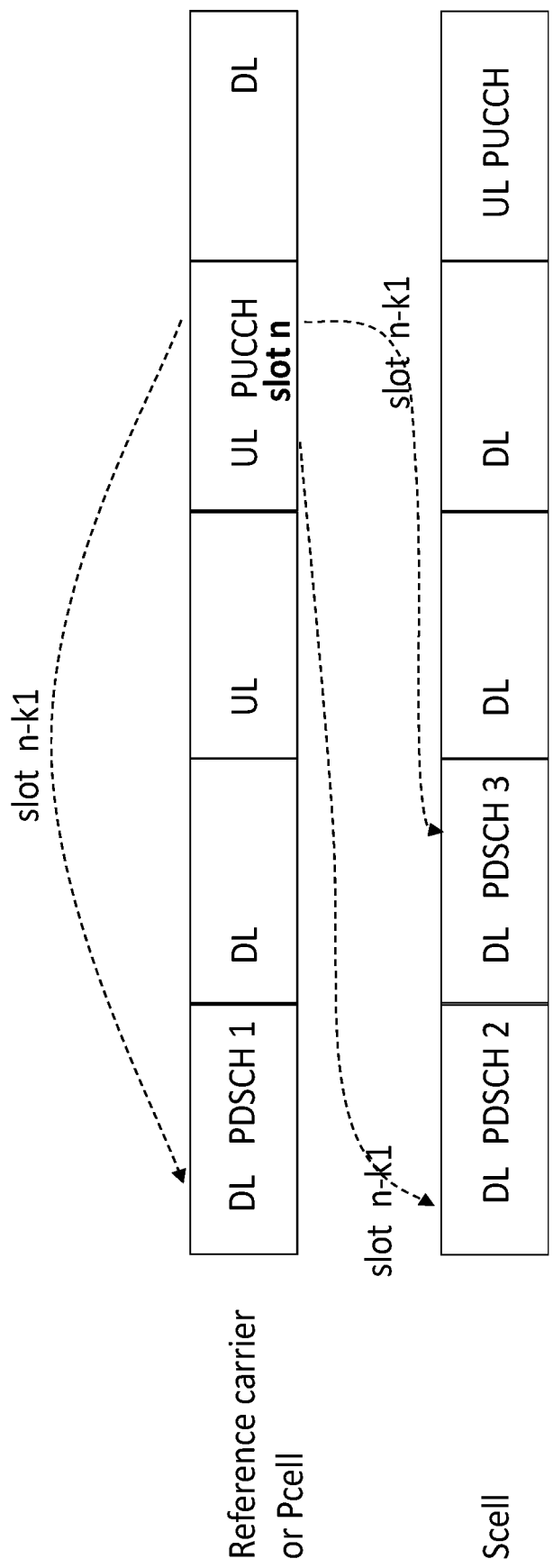
FIG. 1 shows an example of construction of type1 codebook under carrier aggregation.

FIG. 1 illustrates an existing type1 HARQ-ACK codebook construction mechanism based on carrier aggregation. In the case of multiple carriers, only the Pcell will be configured with PUCCH-config so that only the Pcell can be configured with the k1 set (the k1 set may include multiple k1 values). The HARQ-ACK PUCCH is also only allowed to be transmitted in the PCell, so the type1 HARQ-ACK codebook (or described as type1 code book or HARQ-ACK information) is constructed based on the k1 set of the PCell and the slot n for transmitting the HARQ-ACK PUCCH in the PCell.

The specific method based on the slot n and k1 sets can be described as follows: determine downlink (DL) slots from each carrier (Pcell and Scell) based on slot n-k1, and then constructing the type1 codebook based on these slots. For example, determine the slots in the Pcell based on slot n-k1 (where k1 is each k1 value in the k1 set), and then determine the slots in the other carriers (Scell) overlapping with the slots determined in the Pcell in time domains. Then construct the type1 codebook based on the slots (except the uplink (UL) slots) determined from Pcell and Scell.

It can also be described as follows: obtaining (downlink (DL)) slots (in each carrier) based on slot n-k1, and then constructing the type1 codebook based on these slots. This is suitable for situations where there is only one carrier, or where the slots of multiple carriers are of equal length.

With reference to slots for PUCCH transmissions, if the UE detects a DCI format scheduling a PDSCH reception ending in slot n or if the UE detects a DCI format indicating a SPS PDSCH release or indicating SCell dormancy through a PDCCH reception ending in slot n, or if the UE detects a DCI format that requests Type-3 HARQ-ACK codebook report and does not schedule a PDSCH reception through a PDCCH reception ending in slot n, the UE provides corresponding HARQ-ACK information in a PUCCH transmission within slot n+k, where k is a number of slots and can be indicated by the PDSCH-to-HARQ_feedback timing indicator field in the DCI format, if present, or can be provided by dl-DataToUL-ACK, dl-DataToUL-ACK-r16, or dl-DataToUL-ACKForDCIFormat1_2. k=0 corresponds to the last slot of the PUCCH transmission that overlaps with the PDSCH reception or with the PDCCH reception in case of SPS PDSCH release or in case of SCell dormancy indication or in case of the DCI format that requests Type-3 HARQ-ACK codebook report and does not schedule a PDSCH reception.

For semi-static PUCCH carrier switching, because HARQ-ACK PUCCH can be transmitted in Pcell or Scell according to the semi-statically configured PUCCH slot pattern. Therefore, when the PUCCH of a type1 codebook is transmitted in slot n of the Pcell, the existing mechanism is used to construct the type1 codebook directly. For example, get all DL slots used to construct a type1 codebook based on slot n−k1. The k1 set is the k1 set of Pcell.

However, if the PUCCH of a type1 codebook is to be transmitted in slot n in the Scell, how should a type1 codebook be constructed is an existing technical issue. Especially when the length of the Pcell slot and the Scell slot are different. For example, the Pcell slot contains multiple Scell slots. Or Scell slot contains multiple Pcell slots. This result may be because they are configured with different subcarrier spacing, or are configured with UL subslot. After the UL sub slot is configured, the length of a slot is equal to the length of the subslot.

II. Example Embodiments

The UE is configured with a type1 codebook and is configured with semi-static PUCCH carrier switching between Pcell and Scell. If the UE is configured with semi-static PUCCH carrier switching, the base station will configure the PUCCH slots pattern between Pcell and Scell. That is, the UE will be able to know which slots in Pcell and Scell are allowed to be used for HARQ-ACK PUCCH.

If a HARQ-ACK PUCCH of the type 1 codebook is indicated to be transmitted in Scell slot m, then the UE can generate the type1 codebook based on the following rules: the UE can determine a slot n from Pcell. Here slot n is determined to be the slot that overlaps with Scell slot m in the time domain. Based on slot n and the k1 set of Pcell, in all carriers (Pcell and Scell), the UE determines DL slots for constructing the type1 codebook. For example, the DL slots are determined based on slot n-k1 in all carriers.

Figure 2:
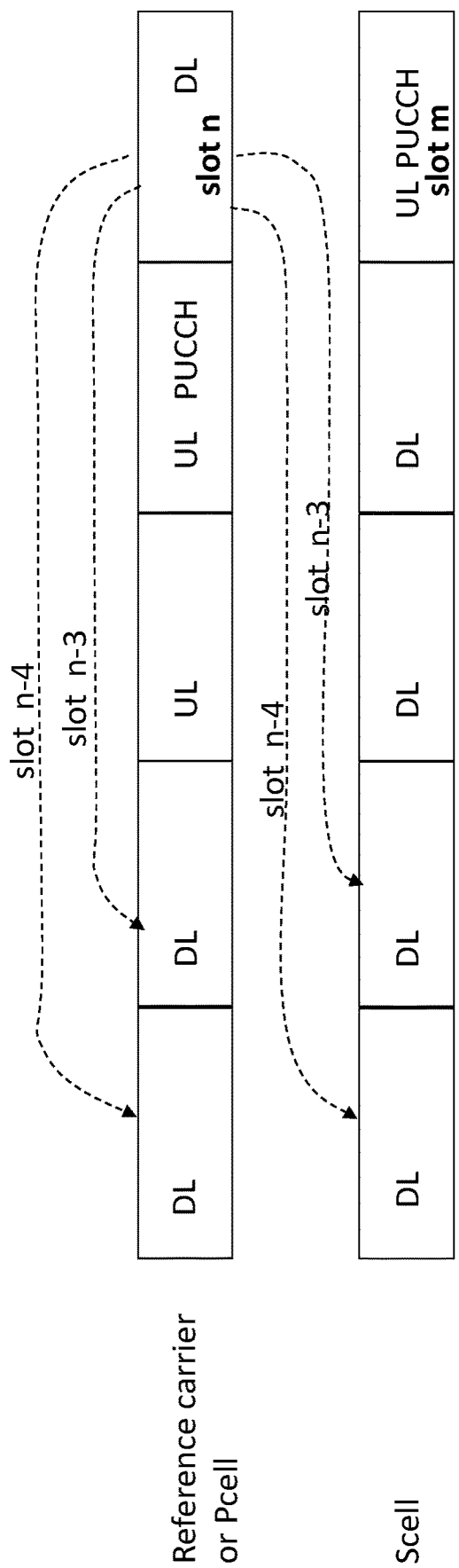
FIGS. 2-3 show examples of construction of type1 codebook where one slot n is obtained by the secondary cell (Scell) from a primary cell (Pcell).
Figure 3:
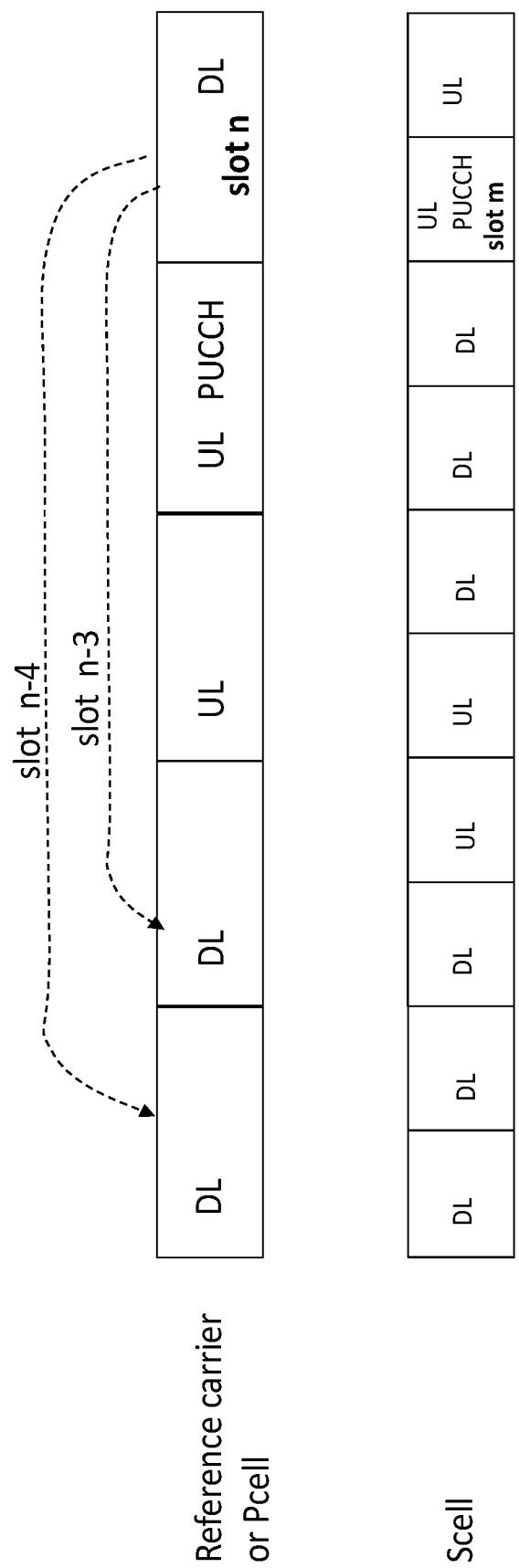

In different cases, the number of slot n obtained from the Pcell is different, for example, only one slot n is obtained in FIG. 2 and FIG. 3. For another example, multiple slot n is obtained in FIG. 4 and FIG. 5. The following further provides corresponding methods for different cases.

II. (a). Case 1

In Pcell, the UE determines that there is only one slot that overlaps with Scell slot m in the time domain. In this way, only one slot in the Pcell is determined by UE to be slot n. This is a case that is illustrated in FIG. 2 and FIG. 3.

The UE can construct the type1 codebook based on the slot n and the k1 set corresponding to the Pcell.

The detailed process is as follows: if the UE is configured with semi-static PUCCH carrier switching, for dynamically scheduled PDSCHs or semi-static transmission of PDSCHs from one or more carriers, the UE can obtain a carrier and a slot from the carrier for the HARQ-ACKs PUCCH corresponding to these PDSCHs based on existing technology. If the UE is configured with a type1 HARQ-ACK codebook, then the type1 HARQ-ACK codebook is generated based on the following method:

If the PUCCH corresponding to a type1 HARQ-ACK codebook is to be transmitted in slot m in the Scell (non-Pcell), the UE should determine a slot of the Pcell that overlaps the slot m in the time domain (the slot of the Pcell is marked as slot n). The slot n can be a UL slot or a DL slot. Then, the UE determines the slots corresponding to the type1 HARQ-ACK codebook from the Pcell and Scell based on the slot n and the k1 corresponding to the Pcell (for example, the slots are obtained through slot n-k1). From these determined slots, determine the PDSCHs corresponding to the HARQ-ACKs used to generate the type 1 codebook. Note: Determining the slots corresponding to the type1 codebook from Scell is based on the following rules: The slots in Scell that overlap with slot n-k1 in Pcell in the time domain are determined as the slots corresponding to the type1 codebook in Scell. Here, the k1 value comes from the k1 set of Pcell.

For example 1, in FIG. 2, it is assumed that the k1 set of Pcell is configured as {3, 4}, and the k1 set of Scell is configured as {1,2}. The PUCCH corresponding to a type1 HARQ-ACK codebook is determined to be transmitted in slot m in the Scell. The UE generates the type1 HARQ-ACK codebook based on the following process:

The UE determines that the slot of the Pcell overlapping the slot m in the time domain is slot n.

The UE determines the slots corresponding to the type1 codebook from the Pcell: The UE determines the slot n-4 and slot n-3 in the Pcell based on the slot n and the k1 corresponding to the Pcell (via slot n-k1), that is, in the Pcell. The first slot and the second slot are determined as the slots corresponding to the type1 codebook. Determine the PDSCHs from the first and second slots. Construct a type1 HARQ-ACK sub-codebook 1 based on the determined PDSCHs.

The UE determines the slots corresponding to the type1 codebook from Scell: Based on the slots determined from the Pcell, in the Scell, the slots of the Scell that overlap with the first slot and the second slot in the Pcell in the time domain are determined as the slots corresponding to the type1 codebook. That is, the first slot and the second slot in the Scell are determined as the slots corresponding to the type1 codebook. Determine the PDSCHs from the first and second slots in the Scell. Construct a type1 HARQ-ACK sub-codebook 2 based on the determined PDSCHs.

The type1 HARQ-ACK sub-codebook 1 and the type1 HARQ-ACK sub-codebook 2 are concatenated to form the final type1 HARQ-ACK codebook, based on the ascending order of the carrier index of the Pcell and Scell.

In FIG. 2, since the slot lengths of Pcell and Scell are the same, Scell slot n-4 and slot n-3 can also be considered to be directly determined by the set of Pcell slot n and k1. For example, slot n-4 and slot n-3 of Scell can be obtained directly through slot n-k1.

For example 2, in FIG. 3, it is assumed that the k1 set of Pcell is configured as {3, 4}, and the k1 set of Scell is configured as {1,2}. The PUCCH corresponding to a type1 HARQ-ACK codebook is determined to be transmitted in slot m in the Scell. The UE generates the type1 HARQ-ACK codebook based on the following process:

The UE determines that the slot of the Pcell overlapping the slot m in the time domain is slot n.

The UE determines the slots corresponding to the type1 codebook from the Pcell: The UE determines the slot n-4 and slot n-3 in the Pcell based on the slot n and the k1 corresponding to the Pcell (via slot n-k1), that is, in the Pcell. The first slot and the second slot are determined as the slots corresponding to the type1 codebook. Determine the PDSCHs from the first and second slots. Construct a type1 HARQ-ACK sub-codebook 1 based on the determined PDSCHs.

The UE determines the slots corresponding to the type1 codebook from Scell: Based on the slots determined from the Pcell, in the Scell, the slots of the Scell that overlap with the first slot and the second slot in the Pcell in the time domain are determined as the slots corresponding to the type1 codebook. That is, the first slot to the fourth slot in the Scell are determined as the slots corresponding to the type1 codebook. Determine the PDSCHs from the first to fourth slot in the Scell (Note that since the fourth slot of Scell is UL, it is excluded). Construct a type1 HARQ-ACK sub-codebook 2 based on the determined PDSCHs.

The type1 HARQ-ACK sub-codebook 1 and the type1 HARQ-ACK sub-codebook 2 are concatenated to form the final type1 HARQ-ACK codebook, based on the ascending order of the carrier index of the Pcell and Scell.

II. (b). Case 2

In Pcell, there are multiple slots that overlap with Scell slot m in the time domain. In this way, multiple slots in Pcell are determined as slot n. For example, in FIG. 4 and FIG. 5.

The UE constructs the type1 codebook based on the slot n and the k1 set corresponding to the Pcell.

For each slot n that satisfies the condition A (further described below), the UE separately constructs a type1 sub-codebook, and concatenates these type1 sub-codebooks to obtain the type1 codebook transmitted in slot m. Concatenation is performed based on the order of these slot n. The type1 sub-codebook is constructed based on each slot n that satisfies the condition A and the k1 set of Pcell. In some embodiments, a UE can optionally determine whether to apply condition A for slot n. If the application of condition A is not skipped, condition A will help reduce the overhead of the type1 codebook. If the application of condition A is skipped, the UE can use multiple slot n to construct the type1 codebook, which can be helpful to simplify the process.

Condition A: Based on the rules of semi-static PUCCH carrier switching, in the process of determining a carrier (or cell) and slot to transmit at least one HARQ-ACK PUCCH corresponding to a PDSCH (or PDCCH), the HARQ-ACK PUCCH to be transmitted in slot m in Scell is associated with (or pointed to) the slot n of the Pcell based on the k1 value in the (activated) DCI corresponding to the PDSCH (or PDCCH). Here, slot n can be a DL slot or a UL slot. Slot m is a UL slot or a slot containing UL symbols. TS38.213 describes at least some of the rules of semi-static PUCCH carrier switching.

The detailed process can include the following: if the UE is configured with semi-static PUCCH carrier switching, for dynamically scheduled PDSCHs or semi-static transmission of PDSCHs from one or more carriers, the UE can obtain a carrier and a slot from the carrier for the HARQ-ACKs PUCCH corresponding to these PDSCHs based on existing technology. If the UE is configured with a type1 HARQ-ACK codebook, then the type1 HARQ-ACK codebook is generated based on the following method:

If the PUCCH corresponding to a type1 HARQ-ACK codebook is to be transmitted in slot m in the Scell (non-Pcell), the UE should determine slots of the Pcell that overlap the slot m in the time domain (the slots of the Pcell are marked as slot n). The slot n can be a UL slot or a DL slot.

Note: There are multiple slots n here, for example, slot n are 2 slots, which are marked as slot n_1 and slot n_2 respectively. It is assumed here that both slot n_1 and slot n_2 satisfy condition A.

Then, the UE determines the slots corresponding to the type1 HARQ-ACK codebook from the Pcell and Scell based on the slot n(slot n_1 and slot n_2) and the k1 corresponding to the Pcell (for example, the slots are obtained through slot n-k1). From these determined slots, determine the PDSCHs corresponding to the HARQ-ACKs used to generate the type 1 codebook. Note: Determining the slots corresponding to the type1 codebook from Scell is based on the following rules: The slots in Scell that overlap with slot n-k1 in Pcell in the time domain are determined as the slots corresponding to the type1 codebook in Scell. Here, the k1 value comes from the k1 set of Pcell.

Then, perform the following operations for slot n_1:

The UE determines the corresponding slots of the type1 HARQ-ACK codebook in the Pcell and Scell based on the slot n_1 and the k1 corresponding to the Pcell (through slots n_1-k1). From these determined slots, determine the PDSCHs used to generate HARQ-ACKs. Note: Determining the slots corresponding to the type1 codebook from Scell is based on the following rules: The slots in Scell that overlap with slot n_1-k1 in Pcell in the time domain are determined as the slots corresponding to the type1 codebook in Scell. Here, the k1 value comes from the k1 set of Pcell. In this way, the type1 HARQ-ACK sub-codebook corresponding to slot n_1 is determined.

Then, perform the following operations for slot n_2:

The UE determines the corresponding slots of the type1 HARQ-ACK codebook in the Pcell and Scell based on the slot n_2 and the k1 corresponding to the Pcell (through slots n_2-k1). From these determined slots, determine the PDSCHs used to generate HARQ-ACKs. Note: Determining the slots corresponding to the type1 codebook from Scell is based on the following rules: The slots in Scell that overlap with slot n_2-k1 in Pcell in the time domain are determined as the slots corresponding to the type1 codebook in Scell. Here, the k1 value comes from the k1 set of Pcell. In this way, the type1 HARQ-ACK sub-codebook corresponding to slot n_2 is determined.

Concatenate the type1 HARQ-ACK sub-codebook corresponding to slot n_1 and slot n_2 to obtain the final type1 HARQ-ACK codebook, for example, based on the sequence of slot n_1 and slot n_2.

Figure 4:
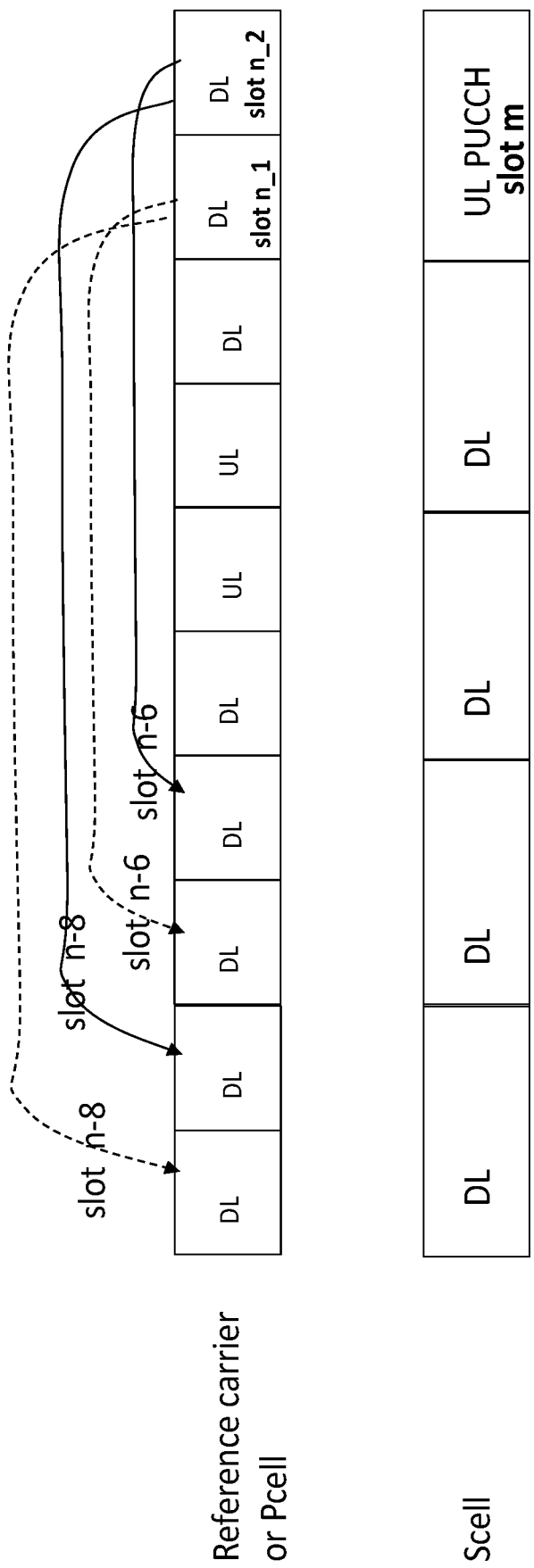
FIGS. 4-5 show examples of construction of type1 codebook where multiple slot n is obtained by the secondary cell (Scell) from a primary cell (Pcell).

For example 3, in FIG. 4, suppose that the k1 set of Pcell is configured as {6, 8}, and the k1 set of Scell is configured as {1,2}. The PUCCH corresponding to a type1 HARQ-ACK codebook is determined to be transmitted in slot m in the Scell. The UE generates the type1 HARQ-ACK codebook based on the following process:

Determine that the slot in the Pcell that overlaps with the slot m in the time domain is slot n. In FIG. 4, there are two slot n, which are respectively marked as slot n_1 and slot n_2. It is assumed here that both slot n_1 and slot n_2 satisfy condition A. The UE performs the following operations based on slot n_1 and slot n_2 respectively.

When slot n is slot n_1:

The UE determines the slots corresponding to the type1 codebook from Pcell: The UE determines the slot n−8 and slot n−6 in the Pcell based on the slot n and the corresponding k1 of the Pcell (that is, slot n-k1). That is, the first slot and the third slot in the Pcell are determined to be slot n. Determine the PDSCHs from the first slot and the third slot. Construct a type1 HARQ-ACK sub-codebook 1 based on the determined PDSCHs.

The UE determines the slots corresponding to the type1 codebook from Scell: Based on the slots determined from the Pcell, in the Scell, the slots of the Scell that overlap with the first slot and the third slot in the Pcell in the time domain are determined as the slots corresponding to the type1 codebook. That is, the first slot to the second slot in the Scell are determined as the slots corresponding to the type1 codebook. Determine the PDSCHs from the first to second slot in the Scell. Construct a type1 HARQ-ACK sub-codebook 2 based on the determined PDSCHs.

The type1 HARQ-ACK sub-codebook 1 and the type1 HARQ-ACK sub-codebook 2 are concatenated to form the type1 HARQ-ACK codebook, based on the ascending order of the carrier index of the Pcell and Scell.

When slot n is slot n_2:

The UE determines the slots corresponding to the type1 codebook from Pcell: The UE determines the slot n−8 and slot n−6 in the Pcell based on the slot n and the corresponding k1 of the Pcell (that is, slot n-k1). That is, the second and fourth slot in the Pcell are determined to be slot n. Determine the PDSCHs from the second slot and the fourth slot. Construct a type1 HARQ-ACK sub-codebook 3 based on the determined PDSCHs.

The UE determines the slots corresponding to the type1 codebook from Scell: Based on the slots determined from the Pcell, in the Scell, the slots of the Scell that overlap with the second slot and the fourth slot in the Pcell in the time domain are determined as the slots corresponding to the type1 codebook. That is, the first slot to the second slot in the Scell are determined as the slots corresponding to the type1 codebook. Determine the PDSCHs from the first to second slot in the Scell. Construct a type1 HARQ-ACK sub-codebook 4 based on the determined PDSCHs. Note: These slots are the same as the Scell slots obtained based on slot n_1.

The type1 HARQ-ACK sub-codebook 3 and the type1 HARQ-ACK sub-codebook 4 are concatenated to form the type1 HARQ-ACK codebook, based on the ascending order of the carrier index of the Pcell and Scell.

Then, the type1 HARQ-ACK codebooks corresponding to slot n_1 and slot n_2 are concatenated to obtain the final type1 HARQ-ACK codebook, for example, based on the sequence of slot n.

In the above example 3, since there are multiple slot n to be determined, such as slot n_1 and slot n_2, the slots determined from Scell through them are exactly the same. In example 3, the slots determined from Scell through slot n_1 are the first slot and the second slot in Scell. The slots determined from the Scell through slot n_2 are also the first slot and the second slot in the Scell.

In this way, when constructing the type1 codebook, the first slot and the second slot of the Scell are repeatedly used, which will result in a large overhead for the type1 codebook.

An improved method is given below to deal with this situation.

Based on the above method, a technical feature can include the following: delete the repeated slots from the determined slots from Pcell and Scell when constructing the type1 codebook as further explained below.

Processing Method 1:

Based on slot n_1 and the k1 set of Pcell, determine slots from Pcell and Scell, and mark these slots as slot set A. Based on slot n_2 and the k1 set of Pcell, determine slots from Pcell and Scell, and mark these slots as slot set B. The same slots in set A and set B are marked as set C. The slots corresponding to set C are deleted from set B, and a new set B is obtained.

Use set A to construct a type1 HARQ-ACK sub-codebook. For details, refer to the type1 HARQ-ACK codebook structure when slot n is slot n_1 in the above method.

Use the new set B to construct a type1 HARQ-ACK sub-codebook. For details, refer to the type1 HARQ-ACK codebook structure when slot n is slot n_2 in the above method.

Then concatenate the type1 HARQ-ACK sub-codebooks corresponding to the set A and the new set B to obtain the final type1 HARQ-ACK codebook.

Processing Method 2:

Based on slot n_1 and the k1 set of the Pcell, determine the slots from the Pcell, and mark these slots as the set Q1. Based on the above method, in FIG. 4, in the Pcell, the determined slots are the first slot and the third slot.

Based on the slot n_2 and the k1 set of the Pcell, determine the slots from the Pcell, and mark these slots as the set Q2. Based on the above method, in FIG. 4, in the Pcell, the determined slots are the second slot and the fourth slot.

Therefore, determine the PDSCHs from the first, second, third and fourth slots in the Pcell. Construct a type1 HARQ-ACK sub-codebook 1 based on the determined PDSCHs.

Based on slot n_1 and the k1 set of Pcell, determine slots from Scell, and mark these slots as set P1. Based on the above method, in FIG. 4, in Scell, the determined slots are the first slot and the second slot.

Based on slot n_2 and the k1 set of Pcell, determine slots from Scell, and mark these slots as set P2. Based on the above method, in FIG. 4, in Scell, the determined slots are the first slot and the second slot.

Therefore, determine the PDSCHs from the first and second slots in the Scell. Construct a type1 HARQ-ACK sub-codebook 2 based on the determined PDSCHs.

Then the type1 HARQ-ACK sub-codebook 1 and the type1 HARQ-ACK sub-codebook 2 are concatenated to obtain the final type1 HARQ-ACK codebook.

Figure 5:
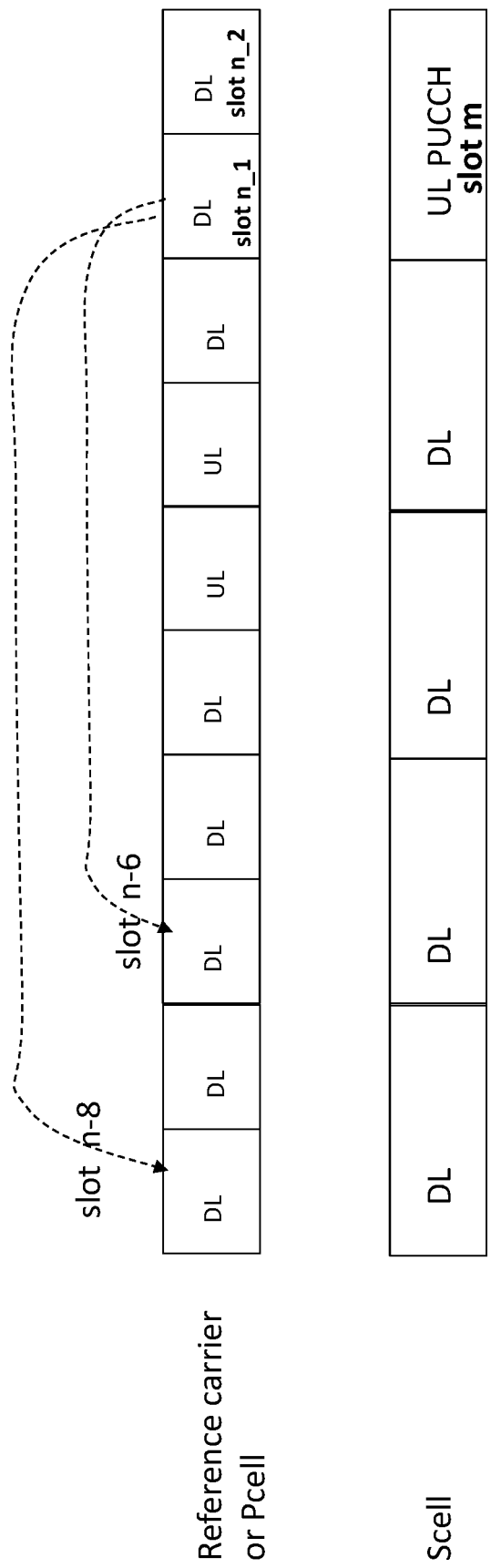

For example 4, in FIG. 5, suppose that the k1 set of Pcell is configured as {6, 8}, and the k1 set of Scell is configured as {1,2}. The PUCCH corresponding to a type1 HARQ-ACK codebook is determined to be transmitted in slot m in the Scell. The UE generates the type1 HARQ-ACK codebook based on the following process:

Determine that the slot in the Pcell that overlaps with the slot m in the time domain is slot n. In FIG. 5, there are two slot n, which are respectively marked as slot n_1 and slot n_2. It is assumed that slot n_1 meets condition A, and slot n_2 does not meet condition A. Note: Although slot n_2 overlaps with slot m in the time domain, none of the HARQ-ACK PUCCH corresponding to PDSCH or PDCCH scheduled in Pcell or Scell is associated with (or pointed to) slot n_2 based on (activated) k1 in DCI. k1 comes from Pcell. A simple example, based on the above assumption of the k1 value, in FIG. 5, no PDSCH is scheduled in the second slot and the fourth slot of the Pcell, and no PDSCH is scheduled in the first slot and the second slot of the Scell (or PDSCHs are scheduled in the Scell, but the HARQ-ACKs PUCCH of the PDSCHs is not pointed to the slot n_2 in the Pcell), so according to the k1 set of the Pcell, the UE determines that no HARQ-ACK PUCCH corresponding to any PDSCH is pointed to slot n_2. UE only performs the following operations based on slot n_1.

When slot n is slot n_1:

The UE determines the slots corresponding to the type1 codebook from Pcell: The UE determines the slot n−8 and slot n−6 in the Pcell based on the slot n and the corresponding k1 of the Pcell (that is, slot n-k1). That is, the first slot and the third slot in the Pcell are determined to be slot n. Determine the PDSCHs from the first slot and the third slot. Construct a type1 HARQ-ACK sub-codebook 1 based on the determined PDSCHs.

The UE determines the slots corresponding to the type1 codebook from Scell: Based on the slots determined from the Pcell, in the Scell, the slots of the Scell that overlap with the first slot and the third slot in the Pcell in the time domain are determined as the slots corresponding to the type1 codebook. That is, the first slot to the second slot in the Scell are determined as the slots corresponding to the type1 codebook. Determine the PDSCHs from the first to second slot in the Scell. Construct a type1 HARQ-ACK sub-codebook 2 based on the determined PDSCHs.

The type1 HARQ-ACK sub-codebook 1 and the type1 HARQ-ACK sub-codebook 2 are concatenated to form the final type1 HARQ-ACK codebook, based on the ascending order of the carrier index of the Pcell and Scell.

Another possible processing method is as follows in order to avoid greater redundancy overhead in the type1 HARQ-ACK codebook.

The UE expects that there is always only one slot n that satisfies the condition A. That is, in the Pcell, when there are multiple slots that overlap with slot m in the time domain, only one slot n can satisfy the condition A. The UE determines slots based on the only slot n and the k1 set of the Pcell to construct the type1 HARQ-ACK codebook from all carriers. Condition A is as described above.

Another technical feature is provided below in order to construct a type1 HARQ-ACK codebook.

Based on the same background described above, if the PUCCH corresponding to a type1 HARQ-ACK codebook is determined to be transmitted in slot m in the Scell. The UE generates the type1 HARQ-ACK codebook based on the following process:

Based on the ratio of the slot length of the Pcell to the slot length of the Scell, denoted as R, the UE scales the k1 value in the k1 set of the Pcell to obtain a new k1 set. Use the new k1 set to determine the slots corresponding to the type1 codebook from the Scell. Then based on the determined slots in the Scell, determine the slots from the Pcell to construct the type1 codebook. Then determine the PDSCHs based on the determined slots from Pcell and Scell. Construct the type1 HARQ-ACK codebook based on the determined PDSCHs.

For example, in FIG. 5, it is assumed that the k1 set of Pcell is configured as {6, 8}, and the k1 set of Scell is configured as {1,2}. The ratio of the slot length of the Pcell to the slot length of the Scell is R, and R=1:2. Therefore, the k1 value in the k1 set of Pcell is scaled as follows: the new k1 value=k1*(1:2), and rounded up. Then the new k1 set is {3,4}.

For the Scell, the UE determines the slot corresponding to the type1 codebook from the Scell based on the slot m and the new k1 set. For example, slot m−3 and slot m−4 are determined as the slots corresponding to the type1 codebook. That is, the first and second slots of the Scell in FIG. 5 are determined to be the slots corresponding to the type1 codebook. Determine the PDSCHs from the first and second slots. Construct a type1 HARQ-ACK sub-codebook 1 based on the determined PDSCHs.

In the Pcell, the slots that overlap in the time domain with the slots determined in the Scell are determined as the slots corresponding to the type1 codebook. That is, the first to fourth slots of the Pcell in FIG. 5 are determined as the slots corresponding to the type 1 codebook. Determine the PDSCHs from the first to fourth slots. Construct a type1 HARQ-ACK sub-codebook 2 based on the determined PDSCHs.

Then type1 HARQ-ACK sub-codebook 1 and type1 HARQ-ACK sub-codebook 2 are concatenated to obtain the final type1 HARQ-ACK codebook.

Figure 6:
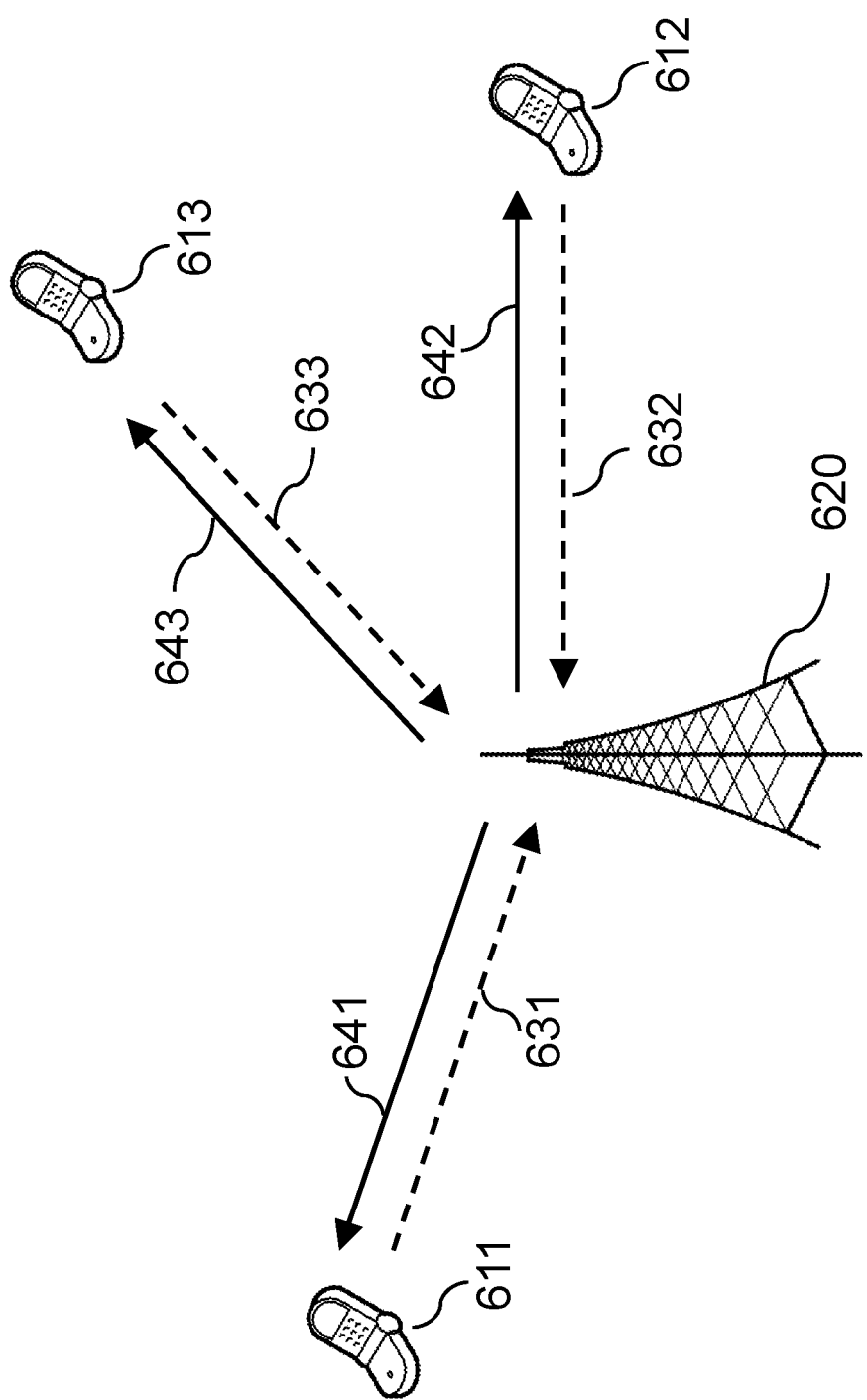
FIG. 6 shows an example of wireless communication including a base station (BS) and user equipment (UE) based on some implementations of the disclosed technology.

The implementations as discussed in this patent document can apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using a communication link to the network (sometimes called uplink direction, as depicted by dashed arrows 631, 632, 633), which then enables subsequent communication (e.g., shown in the direction from the network to the UEs, sometimes called downlink direction, shown by arrows 641, 642, 643) from the BS to the UEs. In some embodiments, the BS send information to the UEs (sometimes called downlink direction, as depicted by arrows 641, 642, 643), which then enables subsequent communication (e.g., shown in the direction from the UEs to the BS, sometimes called uplink direction, shown by dashed arrows 631, 632, 633) from the UEs to the BS. The UE may be, for example, a smartphone, a tablet, a mobile computer, a machine to machine (M2M) device, an Internet of Things (IoT) device, and so on.

Figure 7:
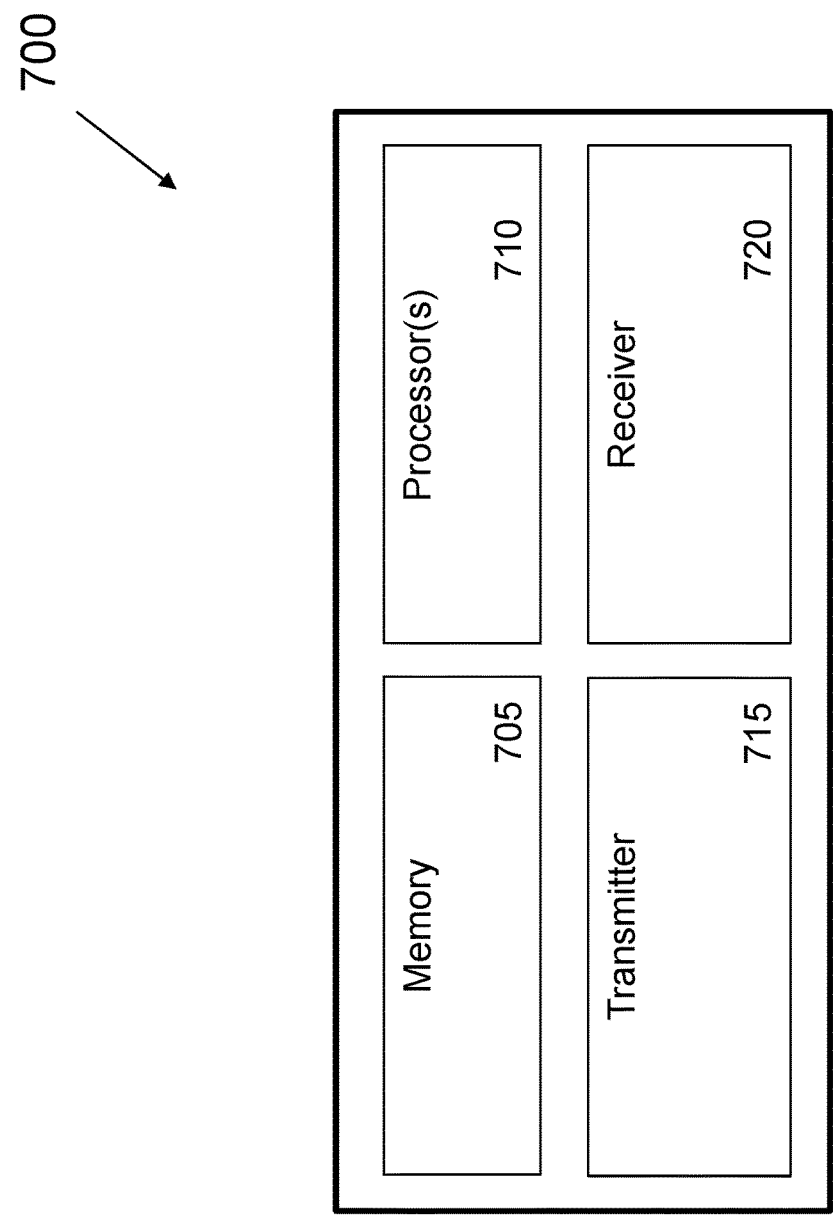
FIG. 7 shows an exemplary block diagram of a hardware platform that may be a part of a network device or a communication device.

FIG. 7 shows an exemplary block diagram of a hardware platform 700 that may be a part of a network device (e.g., base station) or a communication device (e.g., a user equipment (UE)). The hardware platform 700 includes at least one processor 710 and a memory 705 having instructions stored thereupon. The instructions upon execution by the processor 710 configure the hardware platform 700 to perform the operations described in FIGS. 1 to 6 and 8 to 9 and in the various embodiments described in this patent document. The transmitter 715 transmits or sends information or data to another device. For example, a network device transmitter can send a message to a user equipment. The receiver 720 receives information or data transmitted or sent by another device. For example, a user equipment can receive a message from a network device.

Figure 8:
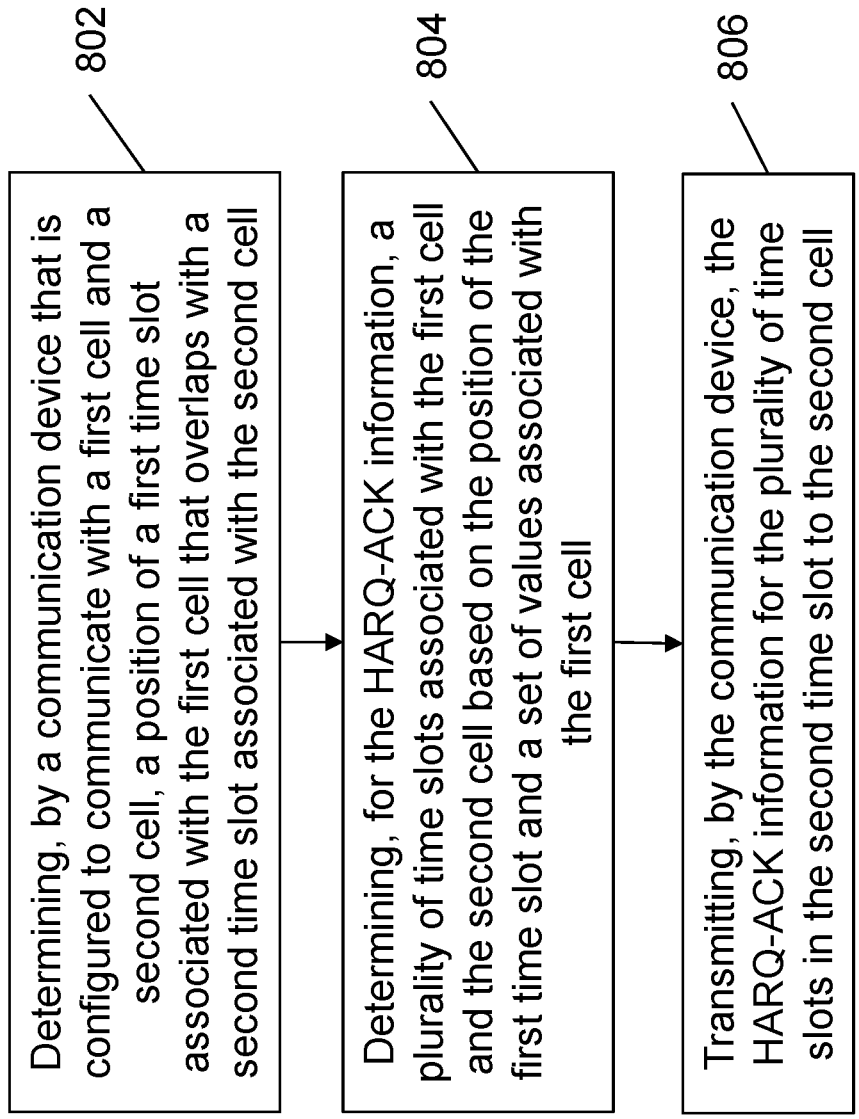
FIGS. 8-9 show two exemplary flowcharts for transmitting a HARQ-ACK information.

FIG. 8 shows an exemplary flowchart for transmitting a HARQ-ACK information. Operation 802 includes determining, by a communication device that is configured to communicate with a first cell and a second cell, a position of a first time slot associated with the first cell that overlaps with a second time slot associated with the second cell, where the second time slot is configured for a transmission of a hybrid automatic repeat request (HARQ) acknowledgement (ACK) information (e.g., HARQ-ACK codebook). Operation 804 includes determining, for the HARQ-ACK information, a plurality of time slots associated with the first cell and the second cell based on the position of the first time slot and a set of values associated with the first cell. Operation 806 includes transmitting, by the communication device, the HARQ-ACK information for the plurality of time slots in the second time slot to the second cell.

In some embodiments, the plurality of time slots includes a first set of time slots associated with the first cell and a second set of time slots associated with the second cell, and each time slot from the first set of time slots of the first cell overlaps with one time slot from the second set of time slots of the second cell. In some embodiments, a slot length of the first cell is the same as that of the second cell. In some embodiments, the plurality of time slots includes a first set of time slots associated with the first cell and a second set of time slots associated with the second cell, and each time slot from the first set of time slots of the first cell overlaps with two or more time slots from the second set of time slots of the second cell. In some embodiments, a slot length of the first cell is greater than that of the second cell.

In some embodiments, the HARQ-ACK information includes a first HARQ-ACK information concatenated with a second HARQ-ACK information, the first HARQ-ACK information indicates whether data or signals are received on the first set of time slots from the first cell, and the second HARQ-ACK information indicates whether data or signals are received on the second set of time slots from the second cell. In some embodiments, the first HARQ-ACK information is concatenated with the second HARQ-ACK information in the HARQ-ACK information based on an ascending order of carrier indexes of the first cell and the second cell.

Figure 9:
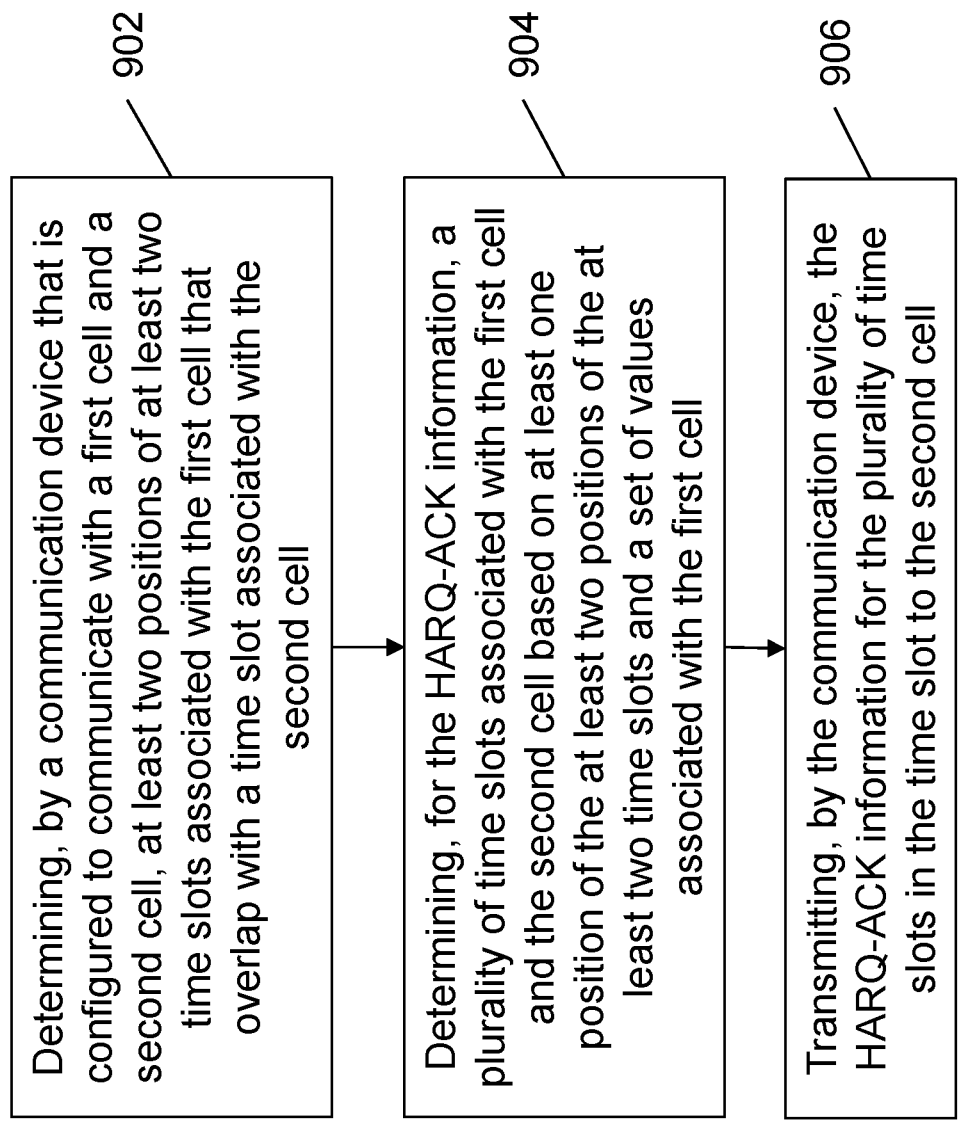

FIG. 9 shows an exemplary flowchart for transmitting a HARQ-ACK information. Operation 902 includes determining, by a communication device that is configured to communicate with a first cell and a second cell, at least two positions of at least two time slots associated with the first cell that overlap with a time slot associated with the second cell, where the time slot is configured for a transmission of a hybrid automatic repeat request (HARQ) acknowledgement (ACK) information. Operation 904 includes determining, for the HARQ-ACK information, a plurality of time slots associated with the first cell and the second cell based on at least one position of the at least two positions of the at least two time slots and a set of values associated with the first cell. Operation 906 includes transmitting, by the communication device, the HARQ-ACK information for the plurality of time slots in the time slot to the second cell.

In some embodiments, the determining the plurality of time slots is performed based on the at least two positions of the at least two time slots, the plurality of time slots includes a first set of time slots associated with the first cell and a second set of time slots associated with the second cell, and each time slot from the second set of time slots of the second cell overlaps with two or more time slot from the first set of time slots of the first cell. In some embodiments, the determining the plurality of time slots is performed based on one position of one time slot from the at least two time slots, the plurality of time slots includes a first set of time slots associated with the first cell and a second set of time slots associated with the second cell, and each time slot from the second set of time slots of the second cell overlaps with two or more time slot from the first set of time slots of the first cell. In some embodiments, a slot length of the first cell is less than that of the second cell.

In some embodiments, the HARQ-ACK information includes a first HARQ-ACK information concatenated with a second HARQ-ACK information, the first HARQ-ACK information indicates whether data or signal are received on the first set of time slots from the first cell, and the second HARQ-ACK information indicates whether data or signal are received on the second set of time slots from the second cell. In some embodiments, the first HARQ-ACK information is concatenated with the second HARQ-ACK information in the HARQ-ACK information based on an ascending order of carrier indexes of the first cell and the second cell.

In some embodiments, the at least two time slots or the one time slot are determined based on: the at least two time slots or the one time slot overlapping with the time slot associated with the second cell, and the at least two time slots or the one time slot being associated with one or more time slots that receives data or signal from the first cell or the second cell based on the set of values associated with the first cell. In some embodiments, in response to the determining the plurality of time slots associated with the first cell and the second cell, the method further comprises: determining that two time slots from the plurality of time slots are repeated; and removing one of the two time slots from the plurality of time slots. In some embodiments, the first cell includes a primary cell, and wherein the second cell includes a secondary cell.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
   determining, by a communication device that is configured to communicate with a first cell and a second cell, a position of a first time slot associated with the first cell that overlaps with a second time slot associated with the second cell,
      wherein the second time slot is configured for a transmission of a hybrid automatic repeat request (HARQ) acknowledgement (ACK) information;
   determining, for the HARQ-ACK information, a plurality of time slots associated with the first cell and the second cell based on the position of the first time slot and a set of values associated with the first cell; and transmitting, by the communication device, the HARQ ACK information associated with the plurality of time slots,
    wherein the HARQ-ACK information is transmitted in the second time slot of the second cell.

2. The method of claim 1,
wherein the plurality of time slots includes a first set of time slots associated with the first cell and a second set of time slots associated with the second cell, and
wherein each time slot from the first set of time slots of the first cell overlaps with one time slot from the second set of time slots of the second cell.

3. The method of claim 2, wherein a slot length of the first cell is same as that of the second cell.

4. The method of claim 1,
wherein the plurality of time slots includes a first set of time slots associated with the first cell and a second set of time slots associated with the second cell, and
wherein each time slot from the first set of time slots of the first cell overlaps with two or more time slots from the second set of time slots of the second cell.

5. The method of claim 4,
wherein the HARQ-ACK information includes a first HARQ-ACK information concatenated with a second HARQ-ACK information,
wherein the first HARQ-ACK information indicates whether data or signals are received on the first set of time slots from the first cell, and
wherein the second HARQ-ACK information indicates whether data or signals are received on the second set of time slots from the second cell.

6. The method of claim 5, wherein the first HARQ-ACK information is concatenated with the second HARQ-ACK information in the HARQ-ACK information based on an ascending order of carrier indexes of the first cell and the second cell.

7. An apparatus for wireless communication comprising a processor configured to implement a method comprising that causes the apparatus to:
determine, by a communication device that is configured to communicate with a first cell and a second cell, a position of a first time slot associated with the first cell that overlaps with a second time slot associated with the second cell,
    wherein the second time slot is configured for a transmission of a hybrid automatic repeat request (HARQ) acknowledgement (ACK) information;
determine, for the HARQ-ACK information, a plurality of time slots associated with the first cell and the second cell based on the position of the first time slot and a set of values associated with the first cell; and
transmit, by the communication device, the HARQ ACK information associated with the plurality of time slots,
    wherein the HARQ-ACK information is transmitted in the second time slot of the second cell.

8. The apparatus of claim 7,
wherein the plurality of time slots includes a first set of time slots associated with the first cell and a second set of time slots associated with the second cell, and
wherein each time slot from the first set of time slots of the first cell overlaps with one time slot from the second set of time slots of the second cell.

9. The apparatus of claim 8, wherein a slot length of the first cell is same as that of the second cell.

10. The apparatus of claim 7,
wherein the plurality of time slots includes a first set of time slots associated with the first cell and a second set of time slots associated with the second cell, and
wherein each time slot from the first set of time slots of the first cell overlaps with two or more time slots from the second set of time slots of the second cell.

11. The apparatus of claim 10,
wherein the HARQ-ACK information includes a first HARQ-ACK information concatenated with a second HARQ-ACK information,
wherein the first HARQ-ACK information indicates whether data or signals are received on the first set of time slots from the first cell, and
wherein the second HARQ-ACK information indicates whether data or signals are received on the second set of time slots from the second cell.

12. The apparatus of claim 11, wherein the first HARQ-ACK information is concatenated with the second HARQ-ACK information in the HARQ-ACK information based on an ascending order of carrier indexes of the first cell and the second cell.

13. A non-transitory computer readable program storage medium having code stored thereon, the code, when executed by a processor, causing the processor to implement a method comprising:
determining, by a communication device that is configured to communicate with a first cell and a second cell, a position of a first time slot associated with the first cell that overlaps with a second time slot associated with the second cell,
    wherein the second time slot is configured for a transmission of a hybrid automatic repeat request (HARQ) acknowledgement (ACK) information;
determining, for the HARQ-ACK information, a plurality of time slots associated with the first cell and the second cell based on the position of the first time slot and a set of values associated with the first cell; and
transmitting, by the communication device, the HARQ ACK information associated with the plurality of time slots,
    wherein the HARQ-ACK information is transmitted in the second time slot of the second cell.

14. The non-transitory computer readable program storage medium of claim 13,
wherein the plurality of time slots includes a first set of time slots associated with the first cell and a second set of time slots associated with the second cell, and
wherein each time slot from the first set of time slots of the first cell overlaps with one time slot from the second set of time slots of the second cell.

15. The non-transitory computer readable program storage medium of claim 14, wherein a slot length of the first cell is same as that of the second cell.

16. The non-transitory computer readable program storage medium of claim 13,
wherein the plurality of time slots includes a first set of time slots associated with the first cell and a second set of time slots associated with the second cell, and
wherein each time slot from the first set of time slots of the first cell overlaps with two or more time slots from the second set of time slots of the second cell.

17. The non-transitory computer readable program storage medium of claim 16,
wherein the HARQ-ACK information includes a first HARQ-ACK information concatenated with a second HARQ-ACK information, wherein the first HARQ-ACK information indicates whether data or signals are received on the first set of time slots from the first cell, and wherein the second HARQ-ACK information indicates whether data or signals are received on the second set of time slots from the second cell.

18. The non-transitory computer readable program storage medium of claim 17, wherein the first HARQ-ACK information is concatenated with the second HARQ-ACK information in the HARQ-ACK information based on an ascending order of carrier indexes of the first cell and the second cell.

19. A wireless communication method, comprising:

configuring, by a network device, a first cell and a second cell for cell switching, and slots pattern between the first cell and the second cell;

configuring, by the network device, the second cell for a transmission of a hybrid automatic repeat request (HARQ) acknowledgement (ACK) information, wherein a position of a first time slot associated with the first cell overlaps with a second time slot associated with the second cell, and wherein the second time slot is configured for the transmission of the HARQ ACK information; and receiving, by the network device, the HARQ ACK information associated with a plurality of time slots, wherein the plurality of time slots are associated with the first cell and the second cell based on the position of the first time slot and a set of values associated with the first cell, wherein the HARQ-ACK information is received in the second time slot of the second cell.

20. The method of claim 19, wherein the plurality of time slots includes a first set of time slots associated with the first cell and a second set of time slots associated with the second cell, and wherein each time slot from the first set of time slots of the first cell overlaps with one time slot from the second set of time slots of the second cell.

21. The method of claim 20, wherein a slot length of the first cell is same as that of the second cell.

* * * * *